United States Patent

Zhou et al.

[11] Patent Number: 5,892,843
[45] Date of Patent: Apr. 6, 1999

[54] TITLE, CAPTION AND PHOTO EXTRACTION FROM SCANNED DOCUMENT IMAGES

[75] Inventors: Jiangying Zhou, Plainsboro; Daniel P. Lopresti, Hopewell, both of N.J.

[73] Assignee: Matsushita Electric Industrial Co., Ltd., Osaka, Japan

[21] Appl. No.: 785,993

[22] Filed: Jan. 21, 1997

[51] Int. Cl.⁶ .................................................. G06K 9/34
[52] U.S. Cl. .......................... 382/176; 382/180; 382/204; 358/462
[58] Field of Search ..................... 382/204, 160, 382/197, 176, 180, 317; 345/517, 521, 524, 519; 364/521; 395/164, 800, 125; 358/296, 452–453, 462; 707/500, 530, 517–521

[56] References Cited

U.S. PATENT DOCUMENTS

| | | | |
|---|---|---|---|
| 4,503,556 | 3/1985 | Scheri et al. | 382/176 |
| 4,741,046 | 4/1988 | Matsunawa et al. | 382/176 |
| 4,750,209 | 6/1988 | Shimura et al. | 382/176 |
| 4,893,188 | 1/1990 | Murakami et al. | 382/176 |
| 5,001,767 | 3/1991 | Yoneda et al. | 382/176 |
| 5,351,314 | 9/1994 | Vaezi | 382/254 |
| 5,555,362 | 9/1996 | Yamashita et al. | 382/173 |
| 5,588,072 | 12/1996 | Wang | 382/176 |
| 5,680,479 | 10/1997 | Wang et al. | 382/176 |
| 5,699,453 | 12/1997 | Ozaki | 382/209 |
| 5,703,962 | 12/1997 | Niki et al. | 382/173 |
| 5,748,865 | 5/1998 | Yamamoto et al. | 382/154 |
| 5,751,849 | 5/1998 | Ikeda | 382/176 |
| 5,757,957 | 5/1998 | Tachikawa | 382/178 |
| 5,767,978 | 6/1998 | Revankar et al. | 358/296 |
| 5,774,579 | 6/1998 | Wang et al. | 382/176 |
| 5,848,184 | 12/1998 | Taylor et al. | 382/180 |
| 5,848,191 | 12/1998 | Chen et al. | 382/180 |

*Primary Examiner*—Leo H. Boudreau
*Assistant Examiner*—Bhavesh Mehta
*Attorney, Agent, or Firm*—Harness, Dickey & Pierce, P.L.C.

[57] ABSTRACT

The bitmap image data is analyzed by connected component extraction to identify components or connected components that represent either individual characters or letters, or regions of a nontext image. The connected components are classified as text or nontext based on geometric attributes such as the number of holes, arcs and line ends comprising each component. A nearest-neighbor analysis then identifies which text components represent lines or strings of text and each line or string is further analyzed to determine its vertical or horizontal orientation. Thereafter, separate vertical and horizontal font height filters are used to identify those text strings that are the most likely candidates. For the most likely title candidates a bounding box is defined which can be associated with or overlaid upon the original bitmap data to select the title region for further processing or display. Captions and photographs can also be located.

36 Claims, 9 Drawing Sheets

| Connected Component (Blob) |||
|---|---|---|
| pointer to first segment in segment chain |||
| number of segments in component |||
| maximum segment length |||
| number of black pixels |||
| number of holes |||
| bounding box descriptors |||
| X min | Y min ||
| X max | Y max ||
| upward end count |||
| downward end count |||
| upturned arc count |||
| downturned arc count |||
| marked as text |||

Figure 6

| Nearest Neighbor Graph |
|---|
| number of links (edges) |
| link list |
| (horizontal/vertical) orientation |

Component 'B' and 'C' both have the same minimum distance to 'A'

Figure 9b a horizontal link

Figure 9c

'B' is the nearest neighbor of 'A', 'C' is the nearest neighbor of 'B', they are all part of the same graph

Figure 9d

This graph is classified as horizontal since it has two horizontal links and one vertical link

| Sample | Width | Height | Stroke Width | Holes | Upward Ends | Downward Ends | Upward Arcs | Downward Arcs |
|---|---|---|---|---|---|---|---|---|
| M | 103 | 83 | 22 | 0 | 2 | 3 | 1 | 2 |
| e | 59 | 58 | 24 | 1 | 2 | 1 | 2 | 1 |
| 母 | 115 | 124 | 34 | 2 | 1 | 6 | 5 | 7 |
| 成 | 120 | 121 | 26 | 0 | 4 | 4 | 5 | 3 |
| ■ | 125 | 125 | 9 | 906 | 12 | 19 | 933 | 897 |

Figure 12

TITLE, CAPTION AND PHOTO EXTRACTION FROM SCANNED DOCUMENT IMAGES

BACKGROUND AND SUMMARY OF THE INVENTION

The present invention relates generally to computerized information access. More particularly, the invention relates to a computerized system for extracting title text or photographs (including captions) or other text or nontext regions from bitmap images, such as from scanned documents. The extracted title text or caption text may be used in a number of ways, including keyword searching or indexing of bitmap image databases, while the extracted photographs may be used for graphical browsing.

The world is rapidly becoming an information society. Digital technology has enabled the creation of vast databases containing a wealth of information. The recent explosion in popularity of image-based systems is expected to lead to the creation of enormous databases that will present enormous database access challenges. In this regard, the explosion in popularity of the World Wide Web is but one example of how information technology is rapidly evolving towards an image-based paradigm.

Image-based systems present a major challenge to information retrieval. Whereas information retrieval technology is fairly well advanced in coded character-based systems, these retrieval techniques do not work in image-based systems. That is because image-based systems store information as bitmap data that correspond to the appearance of the printed page and not the information content of that page. Traditional techniques require the conversion of bitmap data into text data, through optical character recognition (OCR) software, before information retrieval systems can go to work.

Unfortunately, optical character recognition software is computationally expensive, and the recognition process is rather slow. Also, typically photographs without text cannot be meaningfully processed with OCR technology. When dealing with large quantities of image-based data, it is not practical to perform optical character recognition on the entire database. Furthermore, even where time and computational resources permit the wholesale OCR conversion of image data into text data, the result is still a large, unstructured database, without a short list of useful keyword that might allow a document of interest to be retrieved and reviewed. Searching through the entire database for selected keywords may not be the optimal answer, as often full text keyword searches generate far too many hits to be useful.

The present invention takes a fresh approach to the problem. The invention recognizes that there will be vast amounts of data that are in bitmap or image format, and that users will want to search this information, just as they now search text-based systems. Instead of converting the entire document from image format to text format, the present invention analyzes the bitmap data in its native format, to extract regions within the image data that correspond to the most likely candidates for document titles, captions or other identifiers, or to extract regions that correspond to photographs. The system extracts these document titles, captions or other identifiers and photographs from the bitmap image data, allowing the extracted regions to be further manipulated in a variety of ways. The extracted titles, captions or photographs can be displayed serially in a list that the user can access to select a document of interest. If desired, the extracted titles or captions can be converted through optical character recognition into text data that then can be further accessed or manipulated using coded character-based information retrieval systems.

Alternatively, even if the entire page is converted using optical character recognition, it may still be useful to locate various titles and other text or nontext regions using the scanned image. The invention will perform this function as well.

The invention is multilingual. Thus it can extract titles or captions from bitmap data, such as from scanned documents and from documents written in a variety of different languages. The title extraction technology of the invention is also writing-system-independent. It is capable of extracting titles from document images without regard to what character set or alphabet or even font style has been used.

Moreover, the system does not require any prior knowledge about the orientation of the text. It is able to cope with document layouts that have mixed orientations, including both vertical orientation and horizontal orientation. The invention is based on certain reasonable "rules" that hold for many, if not all languages. These rules account for the observation that title text or caption text is usually printed in a way to distinguish it from other text (e.g., bigger font, bold face, centered at the top of a column). These rules also account for the observation that intercharacter spacing on a text line is generally closer than interline spacing and that text lines are typically either horizontal or vertical.

The invention extracts titles, captions and photographs from document images using document analysis and computational geometry techniques. The image is stored in a bitmap buffer that is then analyzed using connected-component analysis to extract certain geometric data related to the connected components or blobs of ink that appear on the image page. This geometric data or connected component data is stored in a data structure that is then analyzed by a classification process that labels or sorts the data based on whether each connected component has the geometric properties of a character, or the geometric properties of a portion of an image, such as a bitmap rendition of a photograph.

Following classification, for text components the system then invokes a nearest-neighbor analysis of the connected component data to generate nearest-neighbor graphs. These are stored in a nearest-neighbor graphs data structure that represents a list of linked lists corresponding to the nearest neighbors of each connected component. The nearest-neighbor graphs define bounding boxes around those connected components of data that correspond to, for example, a line of text in a caption. The nearest-neighbor graphs are then classified as horizontal or vertical, depending on whether the links joining the bounding box centers of nearest neighbors are predominately horizontal or vertical.

Next a filter module analyzes the data to determine the average font height of all horizontal data, and a separate average font height for all vertical data. Then, each string of horizontal data is compared with the average; and each string of vertical data is compared with the average, to select those strings that are above the average height or those strings whose height exceeds a predetermined threshold. These are selected as title candidates to be extracted. If desired, further refinement of the analysis can be performed using other geometric features, such as whether the fonts are bold-face, or by identifying which data represent strings that are centered on the page.

After having selected the title candidates, the candidates are referenced back to the original bitmap data. Essentially, the bounding boxes of the connected components are merged into a single bounding box associated with the extracted title and that single bounding box is then referenced back to the bitmap data, so that any bitmap data appearing in the bounding box can be selected as an extracted title. If desired, the extracted title can be further processed using optical character recognition software, to convert the title image into title text.

Similarly, after having selected the photo candidates, the candidates are again referenced back to the original bitmap data. The bounding boxes of photo candidates which overlap with each other are merged into a single bounding box so that bitmaps appearing within the bounding box can be selected and extracted as part of the photo. If desired, caption text associated with a photo region can be identified and processed using optical character recognition software. The caption text can then be used as a tag to help identify the content of the photo, or for later searching.

For a more complete understanding of the invention, its objects and advantages, reference may be had to the following specification and to the accompanying drawings.

DESCRIPTION OF THE PREFERRED EMBODIMENT

Figure 1:
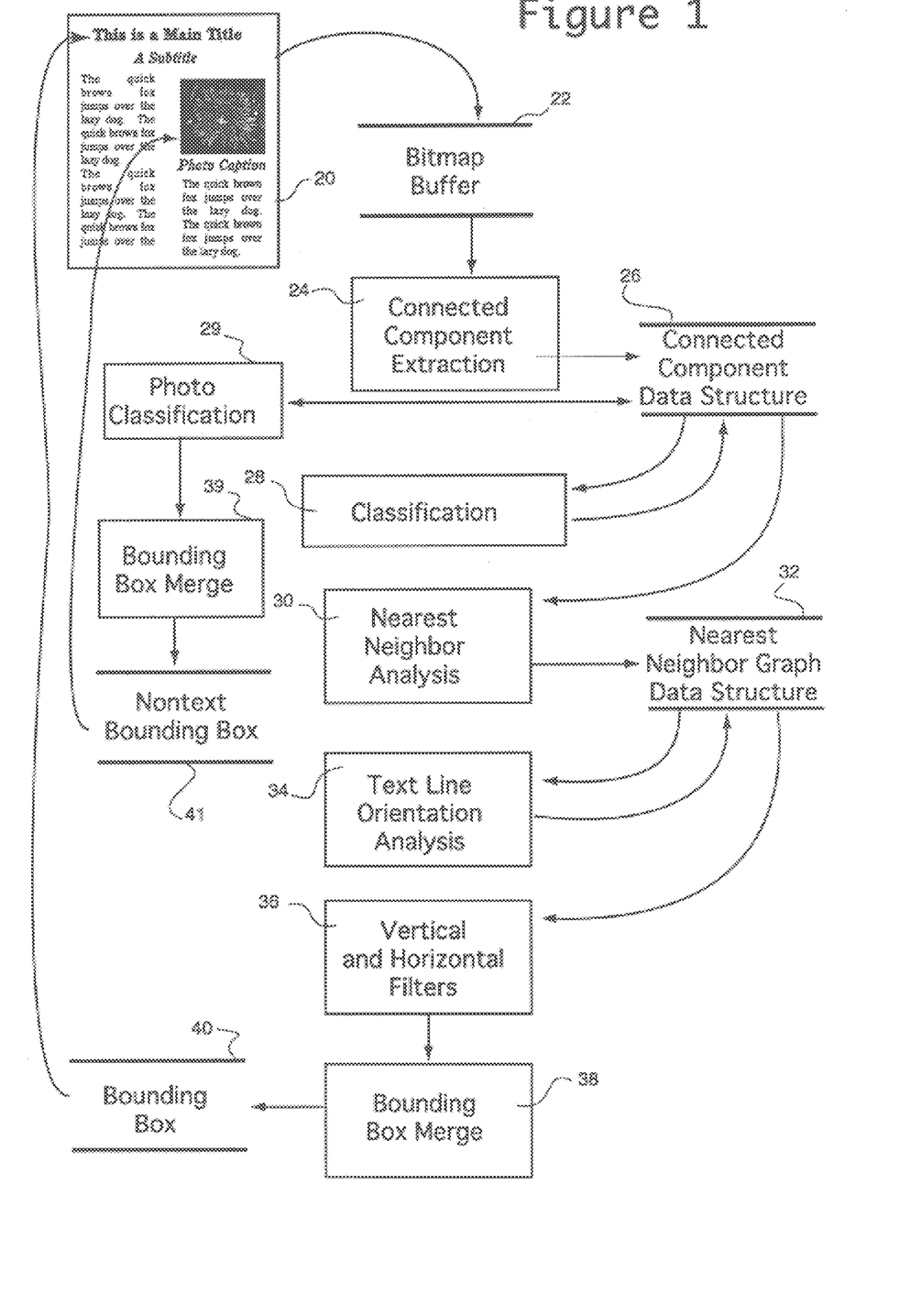
FIG. 1 is a software block diagram of the presently preferred embodiment of the invention.

Referring to FIG. 1, the presently preferred implementation of the title extraction technology is illustrated. The preferred embodiment is a computer-implemented system. FIG. 1 is a software block diagram of the system. The software component is loaded into memory of a suitable computer system, such as a microcomputer system. The functional blocks illustrated in FIG. 1 are thus embodied in and operated by the processor of the computer system.

Referring to FIG. 1, an exemplary page of image data, such as a page 20 from a magazine article has been illustrated. Although the visual image of page 20 is illustrated here, it will be understood that the page actually comprises image data, such as bitmap image data, in which individual black or white pixels of the image are stored as binary numbers. The bitmap image data can come from a wide variety of different sources, including optical scanners, fax machines, copiers, graphics software, video data, World Wide Web pages and the like.

The processor of the computer system on which the invention is implemented maintains a bitmap buffer 22 within the random access memory of the computer system. The bitmap buffer 22 is preferably of a size sufficient to hold all of the bitmap data associated with a given page or image. If desired, the bitmap buffer 22 can be made larger, to hold multiple pages. In general, the size of bitmap buffer 22 will depend upon the resolution of the image. Each individual picture element or pixel is stored in a separate memory location within buffer 22. In some applications, to increase system speed, a page scanned at one resolution (e.g. 300 dots per inch) for archival purposes can be converted to a lower resolution (e.g. 150 dots per inch), and the lower resolution version is then stored in bitmap buffer 22 for further processing as explained herein. Reducing the resolution means that less data must be processed and this will speed up computation. Note that reducing the image resolution in bitmap buffer 22 does not mean that the archival image is necessarily degraded. Once the title regions of interest have been extracted using the invention, the location of these regions can be readily mapped back onto the higher resolution image.

Regarding the bitmap data, the present description will describe the invention in the context of black and white image data. In other words, for purposes of this description, the bitmap data comprises simple binary data representing black and white dots or pixels that make up the overall image. Of course, the techniques described herein can be readily extended to other forms of image data, including multiple bit grayscale data and multiple bit color data. Binary black and white data is used here to simplify the explanation, and to illustrate one possible configuration.

The computer-implemented software system employs a group of processing modules, each designed to perform different data manipulation functions. These processing modules have been illustrated in FIG. 1 by enclosed rectangles. These modules operate upon data stored in memory according to predefined data structures that will be described more fully below. In FIG. 1 the data structures or data stores have been illustrated using open-ended rectangles, to distinguish them from the processing modules. Also, to aid in understanding the invention, the processing modules of the invention have been arranged in FIG. 1 in a top-down order, showing the sequence in which the various modules are placed in service.

Figure 3A:
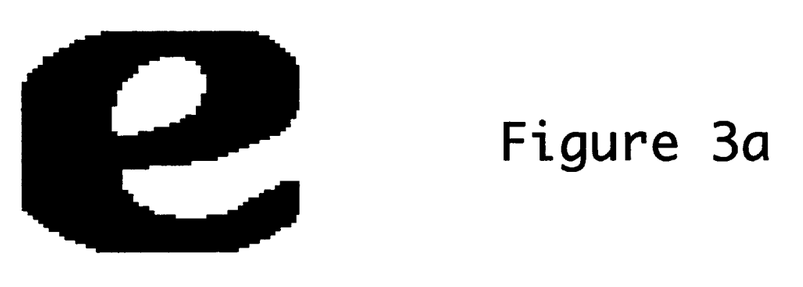
FIG. 3a is an enlarged view of a text connected component example.

First, a connected component extraction process is performed by module 24 upon the data in bitmap buffer 22. This connected component extraction process essentially populates the connected component data structure 26 that is used to store much of the geometric data associated with the bitmap image. A connected component in a binary image is a maximal set of touching black pixels. Module 24 can be configured to perform connected component analysis. Essentially, the connected component extraction process starts with a given data element within bitmap buffer 22 and analyzes the adjacent data elements to determine whether they comprise part of a connected component, as the black dots that make up the printed letter "e" are all connected together. Refer to FIG. 3a for an example. Note that the letter "e" in the example is made up of a collection of connected black dots. Starting at the lower open-ended tail of the letter "e" one can trace the entire letter by traversing from black dot to black dot, as one might traverse a peninsula or isthmus of land without crossing water.

In the preferred embodiment the connected component analysis is performed in a raster-scan fashion whereby contiguous black pixels lying in the same horizontal line are treated as a single unit, called a segment. The connected component is in turn made up of one or more of such segments and may therefore be expressed as a linked list of segments.

Figure 2:
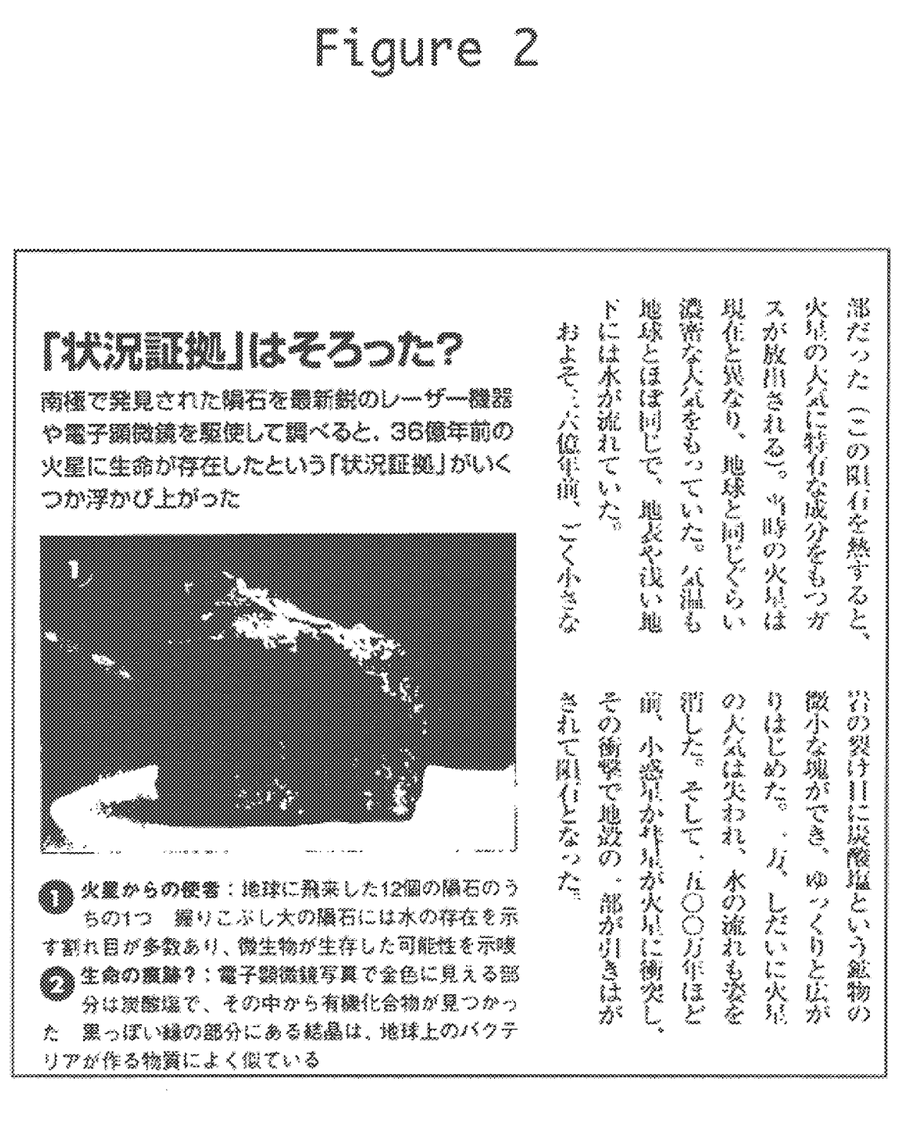
FIG. 2 is a sample page of bitmap data, illustrating both horizontal and vertical text.
Figure 3B:
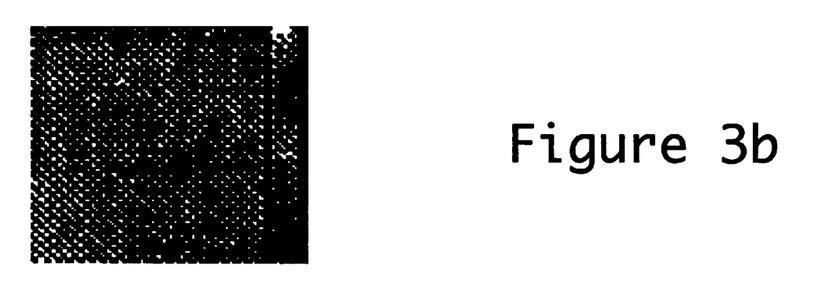
FIG. 3b is an enlargement of a nontext connected component example.

Of course, in a generalized bitmap image, not all of the data will represent characters. By way of illustration, refer to FIG. 2, a sample page of data having both horizontal and vertical text as well as nontext or picture data, specifically a photograph. FIG. 3b shows an exemplary portion of a nontext area. Note that individual connected components can be defined for the nontext data, although these connected components are far more irregular and much more widely varied in size.

In the presently preferred embodiment connected components that represent text are classified by module 28, as will be more fully described below; connected components that represent photographic regions are classified by photo classification module 29, discussed below. After each of these two classification processes, there are further region-specific processing procedures (e.g., line-orientation-determination in the case of text, or bounding-box-merging in the case of photos). These classifications and subsequent processing steps for text and photographic data can be run in either order, or in parallel. For purposes of the present explanation it will be assumed that the text processing is run first and then the photo processing is run on those connected components that were labeled as "non-text" by the text processes. Hence, at the end of the classification processes each connected component will have been assigned one of three possible labels: "text," "photo," "other."

Figure 4:
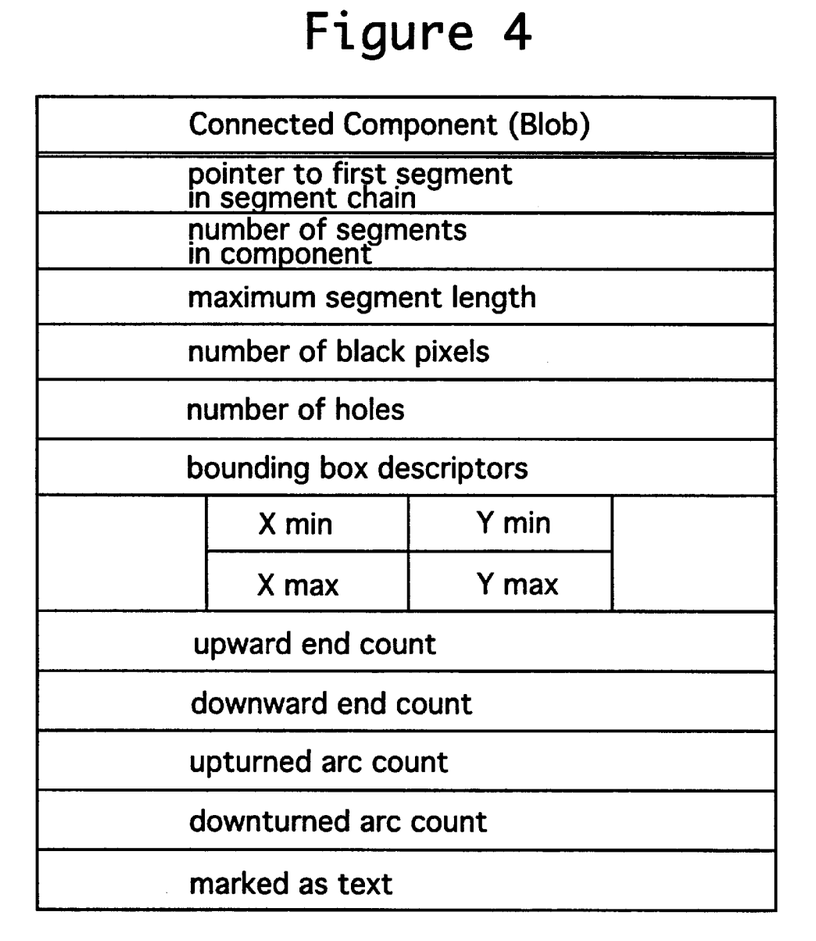
FIG. 4 is a diagram of the connected component data structure used by the presently preferred embodiment.
Figure 10A:
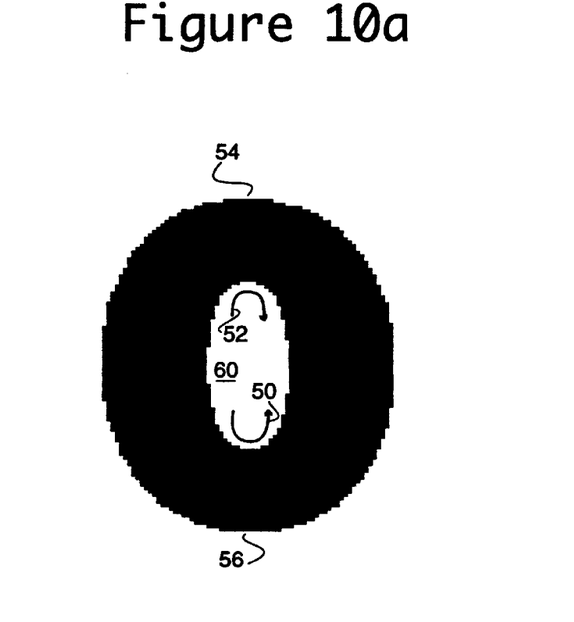
FIGS. 10a and 10b are exemplary text characters "0" and "M" showing various features captured by the present system.
Figure 10B:
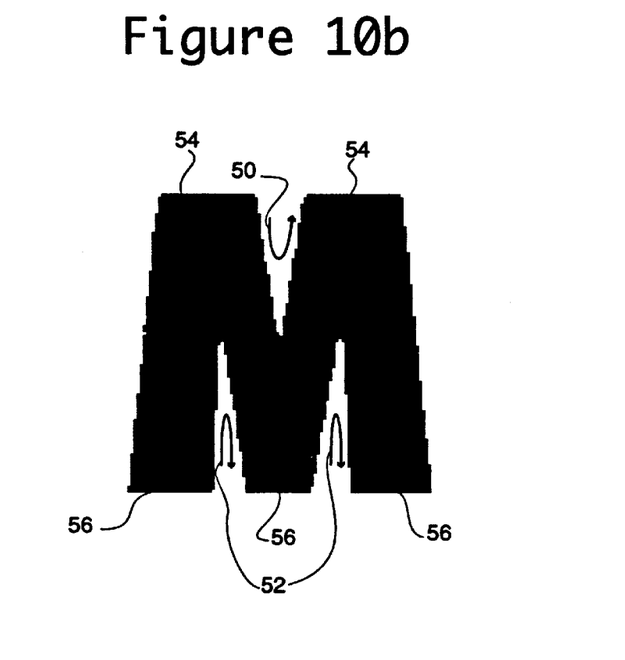
Figure 12:
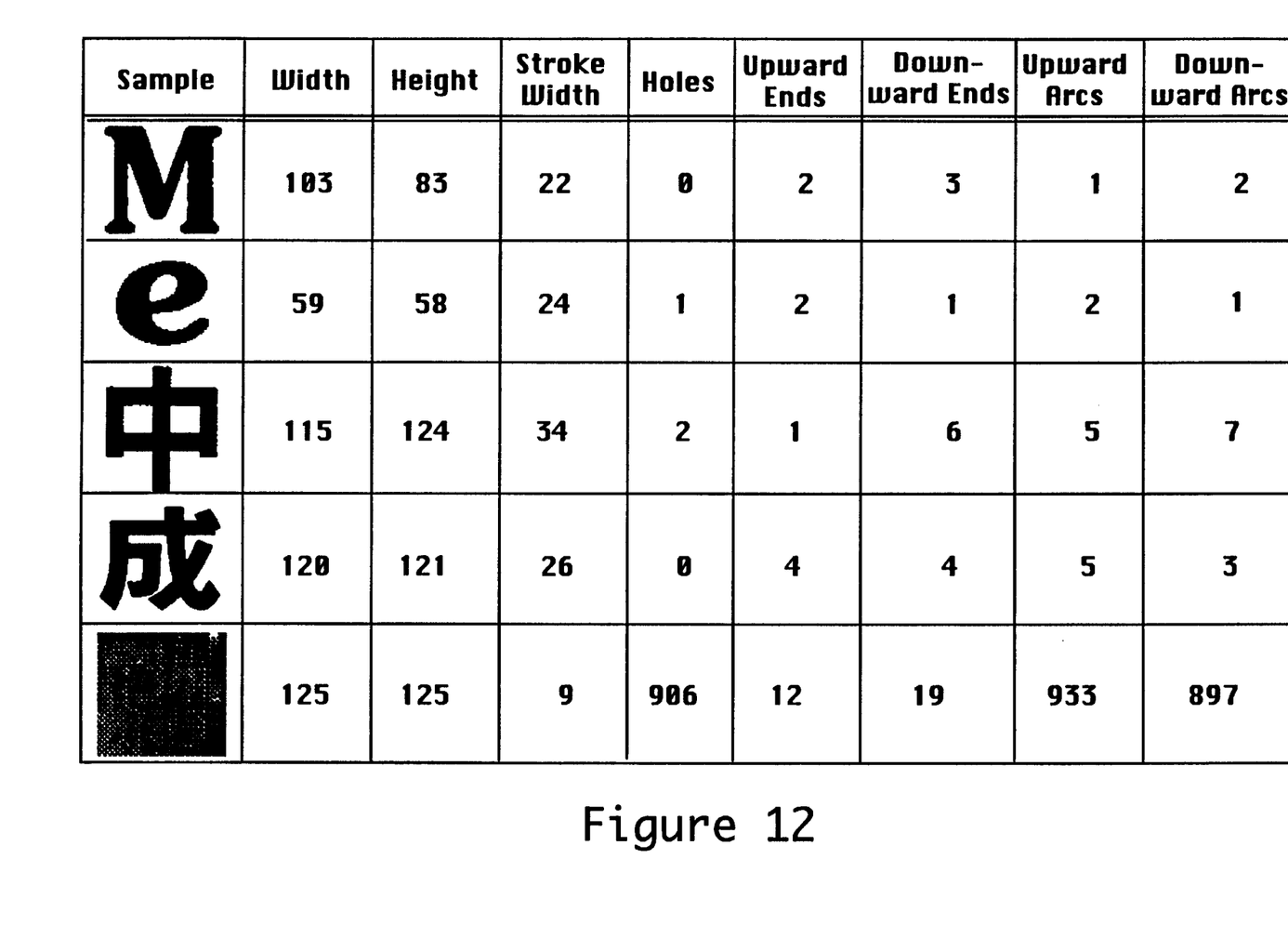
FIG. 12 is a chart showing exemplary text and nontext connected components with the corresponding values of various geometric components that may be used to classify the components.

The connected component extraction module identifies individual connected components or blobs and identifies and extracts various geometric features that are used by other modules later within the program. FIG. 4 graphically shows the configuration of connected component data structure 26 the reader may also wish to refer to the Appendix in which a C language header file listing of this and the nearest-neighbor graph data structure are given. Referring to FIG. 4, the connected component data structure maintains a record of a number of geometric features for each connected component. These features include: the size, width and height of the bounding box that defines the connected component, the number of holes in the connected component, a pointer to the first element in the connected component and various other data describing the number and type of arcs used to form the components. These latter data, illustrated in FIGS. 10a and 10b, are useful in distinguishing characters from noncharacters. The preferred implementation also records how many ends the connected component has. For example, the letter "0," shown in FIG. 10a, has one upward arc 50 and one downward arc 52; one upward end 54 and one downward end 56; and a hole 60. A hole is region of white space surrounded entirely by black space. The letter "M" has two upward ends 54 and three downward ends 56 and two downward arcs 52 and one upward arc 50. In distinguishing text from nontext, these features as well as other features derived from them are used to perform the discrimination. FIG. 12 illustrates some sample components (two English and two Kanji) characters, and a region from a photograph. At this phase in the analysis, there is no attempt made to differentiate between text, photos and other components. The classification module 28 is responsible for discriminating between text components, photo components and other components. The Table gives the actual values computed for the components. Comparing the actual values, note that the nontext component has a much larger number of holes, as well as a much larger number of upward arcs and downward arcs.

The connected component data structure is essentially configured as a list, with each connected component being represented as a separate element in the list. At this phase in the analysis, there is no attempt made to differentiate between text and nontext components. Each connected component (whether text or nontext) is entered into the list according to the data structure shown in FIG. 4.

After the data structure 26 has been populated by the connected component extraction process 24, the classification process or module 28 is then called upon to operate on the data in data structure 26. The classification module is responsible for discriminating between text components and nontext components. English text characters can usually be discriminated from nontext connected components on the basis of the number of holes found in each component. An English character usually has one or two holes at the most. Of course, to accommodate more complex characters, such as Chinese characters, the number of holes threshold may need to be slightly higher. Similarly, the number of ends and the type and number of curves for text characters tend to be smaller than for nontext characters. Again, more complex characters such as Chinese characters will have a slightly higher number of these attributes.

The presently preferred embodiment classifies a connected component or blob as text if it meets the criteria in the following pseudocode:

```
For each connected component:
    IF size of bounding box < predetermined size
        THEN component is nontext, exit routine.
    ELSE IF number of black pixels < predetermined number
        THEN component is nontext, exit routine.
    ELSE IF width or height > predetermined size
        THEN component is nontext, exit routine.
    ELSE IF average stroke width (pixels/segment) > predetermined
width
        THEN component is nontext exit routine.
    ELSE IF width/height ration, or height/width ratio > predetermined
ratio
        THEN component is nontext, exit routine.
    ELSE IF number of holes >= predetermined number
        THEN component is nontext, exit routine.
    ELSE IF number of upward ends and downard ends > predetermined
number
        THEN component is nontext, exit routine.
    ELSE IF ratio of (number of black pixels in bounding box)/(size
of bounding box) < predetermined number
        THEN component is nontext, exit routine.
    ELSE component is text, exit routine.
```

In a similar fashion, the photo classification module 29 classifies the connected component data as "photo" or "non-photo." As noted above, the text classification and photo classification can be implemented in either order, or in parallel.

The presently preferred embodiment classifies a connected component as a region within a photograph if it meets the criteria in the following pseudocode:

```
IF size of bounding box < predetermined size
    THEN component is not a photo, exit routine.
IF # of black pixels < predetermined #
    THEN component is not a photo, exit routine.
IF (width/height) OR (height/width) > predetermined ratio
    THEN component is not a photo, exit routine.
IF (# of black pixels/size of bounding box) < predetermined ratio
    THEN component is not a photo, exit routine.
IF (width > predetermined size) AND (height > predetermined size)
    THEN component is a photo, exit routine.
IF average stroke width (pixels/segment) > predetermined ratio
    THEN component is a photo, exit routine.
IF # of holes > predetermined #
    THEN component is a photo, exit routine.
IF # of upward ends and downward ends > predetermined #
    THEN component is a photo, exit routine.
OTHERWISE component is not a photo, exit routine.
```

The system's ability to discriminate between text, photographs and other image data operates by assigning attributes to various geometric features commonly found in these respective image types. Characters generally comprise solid black strokes, having relatively uniform size and aspect ratio. Characters also generally have a relatively uniform average stroke width. On the other hand, photographic regions tend to be irregularly sized and have irregular aspect ratios. Also, photographic regions have a higher number of holes in a given region or connected component. These holes contribute to the gray-scale appearance that the eye perceives when viewing the region from a distance. These features or attributes can therefore be used to aid in discriminating between text and photographic regions. Of course, there is some overlap. Some photographic regions may have attributes similar to text and some text may have attributes similar to photographic regions. To accommodate this, the system merges bounding boxes of connected components whose bounding boxes overlap. Such overlapping is common in photographic regions. In this way, connected components that would otherwise be characterized as text may be classified as photographic, if the component's bounding box overlaps with bounding boxes of other photographic regions. Likewise, connected components that would otherwise be classified as photographic may be classified as text if the neighboring connected components are text and there is no bounding box overlap. An example of the latter situation would occur when an ornate font is used at the beginning of a line of text, for example.

Once the text and other components have been identified, the connected component data structure can be used to store an indication of how each component was classified. Note that at this point in the analysis, certain data have been selected as having text-like characteristics. There is no optical character recognition performed at this point, so the system is still working with image data and geometric attributes of that image data.

Figure 6:
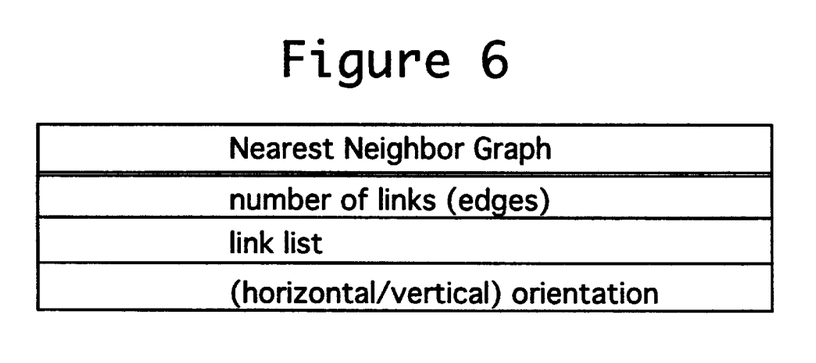
FIG. 6 is a depiction of the nearest-neighbor graph data structure of the presently preferred implementation.

Up to this point each connected component comprises an individual character (or a portion thereof) or individual shape or blob. The next step is to begin grouping characters in order to identify what regions may represent lines or strings of text. A nearest-neighbor analysis is performed to accomplish this. The preferred embodiment uses Delaunay triangulation to construct a nearest-neighbor graph. For background on Delaunay triangulation, see "A Sweepline Algorithm for Voronoi Diagrams," *Algorithmica*, 2:153–174, 1987. The nearest-neighbor analysis exploits the assumptions noted earlier, that intercharacter spacing on a line is generally closer than interline spacing. This is a reasonable assumption to make, and is likely (but not guaranteed) to hold across different languages and character sets. The nearest-neighbor analysis is performed by module 30. It accesses the data in connected component data structure 26 and generates a nearest-neighbor graph that is stored in the nearest-neighbor graph data structure 32. FIG. 6 diagrammatically shows the configuration of the presently preferred data structure for storing the nearest-neighbor graphs. The nearest-neighbor analysis essentially compares each previously identified character component with the other character components to identify which are closest to each other. In the preferred embodiment this is done by geometrically calculating the distance between the centers of character components. The centers of character components are in turn established geometrically by the rectangular bounding boxes that were established for each character during connected component extraction. Recall that the bounding box data, that is, the maximum and minimum X and Y values for each component has been stored in the connected component data structure 26 by module 24.

Figure 5A:
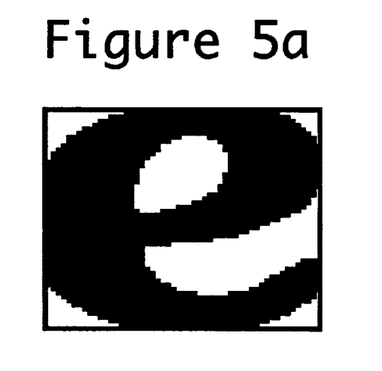
FIGS. 5a and 5b illustrate bounding boxes drawn around a text character (FIG. 5a) and around a nontext element (FIG. 5b)
Figure 5B:
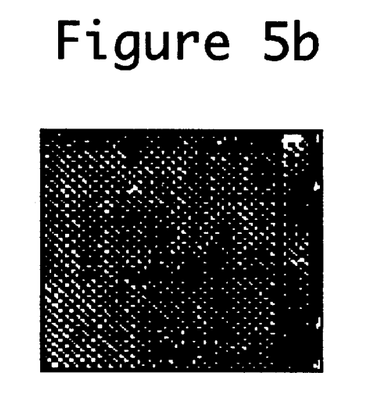
Figure 7:
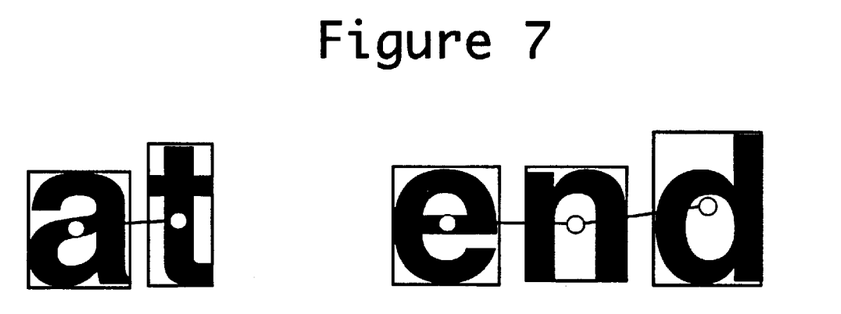
FIG. 7 is a diagram useful in understanding the bounding box techniques employed by the preferred embodiment.
Figure 8:
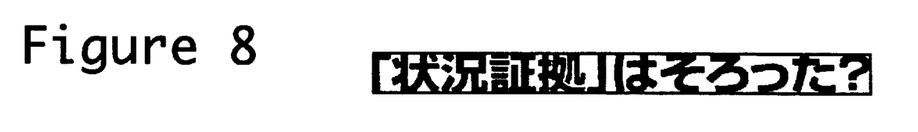
FIG. 8 is an example of a merged bounding box, showing the relationship of the bounding box to the original bitmap of FIG. 2.
Figure 9A:
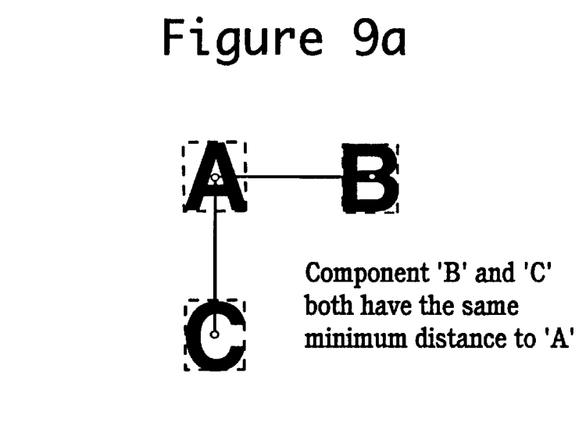
FIGS. 9a–9d illustrate different nearest-neighbor graphs, useful in understanding how horizontal and vertical classification is performed.

To illustrate the nearest-neighbor analysis, refer to FIGS. 5a and 5b and FIG. 7. FIGS. 5a and 5b illustrate how the connected component extraction process defines bounding boxes around an extracted component. Specifically, FIG. 5a shows the bounding box around a text component; FIG. 5b shows the bounding box around a nontext character component. FIG. 7 shows how the nearest-neighbor analysis determines that certain text characters are nearer to one another, and therefore likely part of a single line or string of text. The reason this is so is that in most printing conventions, characters in the same text line are usually placed closer to each other than characters across text lines. Therefore, the nearest neighbor of a text component is likely to be from the same text line. In fact, in a majority of cases, the nearest-neighbor of a character is simply the next character in the sentence. In this way, a string of characters from the same text line are linked together. Normally, characters in one text line are grouped into several nearest-neighbor graphs. The analysis is performed geometrically, seeking those components that are closest to one another. In most cases a connected component will have only one nearest-neighbor. However, sometimes a connected component may have more than one neighbor, each having the same minimum distance. In such cases, all such neighbors are considered to be the nearest neighbors of the component. To accommodate this the data structure represents each component by a linked list. For example, FIG. 9a illustrates the situation in which the component "A" has two nearest-neighbors, component "B" and component "C." The distance between neighbors is measured by a line joining the centers of the respective bounding boxes. The nearest-neighbor analysis constructs a linked list of all components that are at a detected minimal distance from the component's neighbor.

Figure 9B:
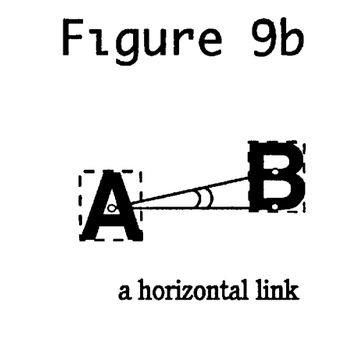
Figure 9C:
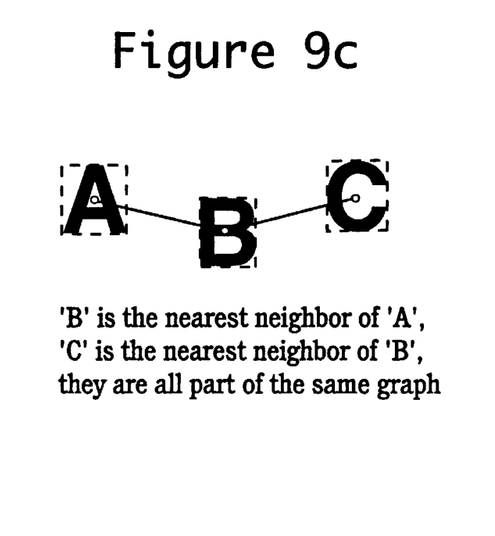

As FIG. 9a illustrates, nearest-neighbor components can be disposed at any orientation (including horizontal and vertical orientations). The presently preferred embodiment identifies links between nearest-neighbor connected components as being either horizontal or vertical. In FIG. 9a the link between components "A" and "B" is a horizontal link, whereas the link between components "A" and "C" is a vertical link. In general, an orientation is given to a link between a connected component and each of its nearest neighbors. For example, if component "B" is the nearest-neighbor of component "A," then the link is horizontal if the line joining the centers of the bounding boxes of "A" and "B" is below a 45° diagonal line, and vertical if otherwise. FIG. 9b illustrates a horizontal link according to this definition. Connected components which are mutually nearest-neighbors form a linked unit, called a nearest-neighbor graph. Referring to FIG. 9c, for example, if component "B" is the nearest-neighbor of component "A," and component "C" is the nearest-neighbor of component "B," then "A," "B" and "C" are all part of the same nearest-neighbor graph. The nearest-neighbor graph data structure includes a data element associated with each entry in the linked list for storing the orientation of the link.

Figure 9D:
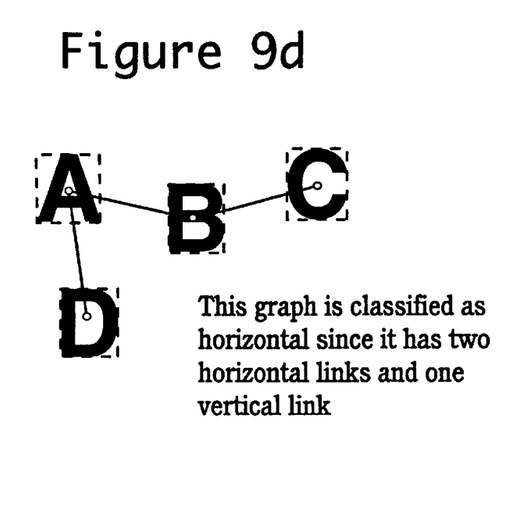

Module 34 examines the geometric orientation of each nearest-neighbor graph to determine whether the line or string of characters linked by a graph is vertically or horizontally arranged. In the current preferred embodiment, each nearest-neighbor graph is classified as horizontal or vertical, depending on the dominant orientation of their links. If the majority of the links are horizontal, then the nearest-neighbor graph is horizontal; otherwise it is vertical. FIG. 9d illustrates an example that a graph is classified as horizontal because it has two horizontal links and one vertical link. Once the orientation of a nearest-neighbor graph is determined, those links in the graph whose orientations do not match the determined orientation are then removed. In FIG. 9d, the vertical link connecting letter "A" and "D" is removed after the graph is identified as horizontally arranged. Module 36 then checks the font size of text components in each orientation and detects candidate title components in each orientation separately.

While a 45° threshold is used in the present implementation for determining the orientation of a link, the system may need to accommodate pages that are skewed, hence different horizontal and vertical thresholds may be suitable. Furthermore, although horizontal and vertical are the only possible orientations of text considered in the present implementation, text of other orientations may be considered if so desired. In particular, the system may be made to identify text lines printed at titled angles. On the other hand, for a system that will be deployed to handle only English text, it may be possible to simplify the foregoing design by eliminating separate processing for vertical text lines.

If further discrimination is required, the font size thresholding decision may be made on a local basis, not on the basis of the page as a whole. While average font size provides a good attribute for discrimination in many cases, systems can be built that employ discrimination attributes other than font size. Such other attributes can also be used together with font size for more refined or additional levels of discrimination. For example, the geometric center of the text string can be compared with the vertical line center of the page or with the vertical line center of columns of text to select as possible title candidates those that are centered at "prominent" positions on the page. Alternatively, or additionally, the stroke width or thickness of the lines forming the characters can be used to identify title candidates. In this regard, a bold-face type having a heavier stroke width would be a more likely candidate as a caption. However, as indicated above, the present embodiment achieves quite successful results using the letter size or font size along as the discriminating feature.

While the presently preferred embodiment uses font size to classify connected components, other geometric attributes, such as those described herein, can be used to augment the classification process. One way to accomplish this is through a sequential or nested-loop approach, where a first level decision is made (using font size, for example), followed by a second level further refining step (using some other attribute), and so forth. For any of the classification steps (e.g., identifying connected components as being either text or photo; or title/nontitle classification of text components), multiple attributes can be considered simultaneously. One way to accomplish this would be to construct vectors for each connected component, where each vector element is one of the selected attributes. Then classification can be performed by comparing the vector data with predetermined vector thresholds. Neural network analysis is another alternative for analyzing multiple attributes concurrently.

To discriminate font sizes, the vertical and horizontal filtration module 36 first computes the average font size of all vertical characters identified on the page, and similarly computes the average font size of all horizontal characters appearing on the page. Module 36 readily performs this by accessing the nearest neighbor graph data structure 32 to isolate the vertical (or horizontal) strings and then reference back by pointer to the connected component data structure to ascertain the height of the corresponding bounding box for that character. Once the horizontal and vertical averages have been computed, then each string is compared to that average. Strings comprising characters that are larger than a predetermined font height threshold are selected as title candidates.

A bounding box is then constructed for each of the selected horizontal and vertical candidates. Module 38 constructs these bounding boxes, essentially by merging the individual bounding boxes of the component characters, selecting the appropriate size so that all characters within a selected line of text are bounded by bounding box. As previously noted, a text line is usually broken into several nearest-neighbor graphs. Thus the merging process in module 38 involves merging bounding boxes of those nearest-neighbor graphs into a single bounding box to form a title text line. These bounding boxes are then suitably stored at 40. Bounding box data stored at 40 essentially describes the (X,Y) positions of the upper left and lower right corners of each bounding box. The positions are referenced to the (X,Y) locations on the original bitmap image 20. Thus, these bounding box coordinates can be used to outline bounding boxes on the original document, thereby selecting the title candidates. If desired, the selected title candidates can then be displayed apart from the original document, as in a list of titles each referenced back to the original document. Alternatively, the titles can be processed through optical character recognition to convert them into character data.

For those connected component identified as photo components, module 39 merges them to form photo regions. The merging process checks the bounding boxes of all photo components; those whose bounding boxes overlap with each other are merged into a single region. A new bounding box encompassing the merged region is then constructed. These bounding boxes are then suitably stored at data store 41. These bounding boxes essentially describes the (X,Y) coordinates of the upper left and lower right corners of each photo region. The positions are references to the (X,Y) locations on the original bitmap image 20. Thus these bounding box coordinates can be used to outline bounding boxes on the original document, thereby selecting the photo regions.

If desired, text representing the caption associated with each photo region can also be identified as part of the process. For each photo regions, a narrow strip of the rectangle frame surrounding the bounding box of the photo is considered. Text lying within the four sides of the strip is examined and a candidate caption text region selected. The selection process may proceed as follows:

```
IF there is horizontal text in the bottom strip
    THEN it is the caption, exit routine.
IF there is horizontal text in the top strip
    THEN it is the caption, exit routine.
IF there is vertical text in the left strip
    THEN it is the caption, exit routine.
IF there is vertical text in the right strip
    THEN it is the caption, exit routine.
OTHERWISE no caption is found, exit routine.
```

Figure 11:
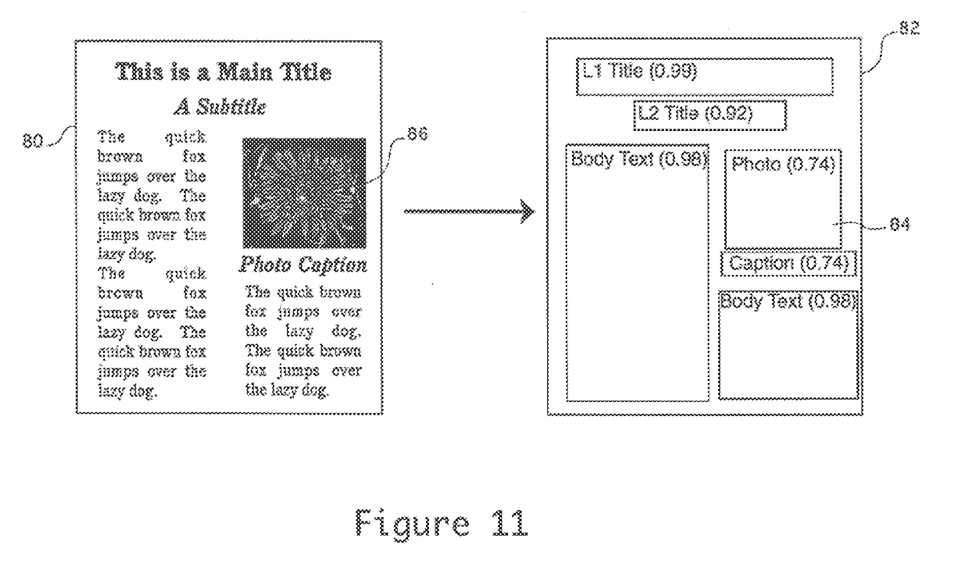
FIG. 11 illustrates how the invention may be applied to labeling regions on a page with assigned confidence factors.

Although the invention has been described in connection with an embodiment that extracts captions, titles and photographs, the invention will also identify basic text regions (whether title or not) as well as other nontext regions, such as graphs, line drawings and the like. Moreover, it is possible to distinguish between different "levels" of text, based on font size, relative placement and so forth. Accordingly, using the technology described herein, a page image, shown at 80 in FIG. 11 can be used to produce output 82 that identifies various different labeled regions. The mechanism for discriminating between text and nontext has been described above. Using this mechanism the image region 84, corresponding to photo 86 may be identified and labeled. In the illustrated embodiment the label includes a confidence value (e.g. 0.74) that indicates how certain the system is about the validity of a given label. Similarly, all text regions can be labeled to indicate the function of the text region (e.g. level 1 [L1] title, level 2 [L2] title, body of text, and so forth). As with the image region, each text region can also include a confidence value.

While the invention has been described in its presently preferred embodiment, it will be understood that the invention is capable of certain modifications without departing from the spirit of the invention as set forth in the appended claims.

APPENDIX

```
#define MXL 1024
/*
 * Structure for run-length sequences (sequences of
 * n, dx1, dx2, . . . dxn) with less than MXL segments.
 * (n<MXL)
 */
typedef struct scanline {
    short n; /* number of segments */
    short x[MXL];
} scanline;
/* Structure for LAG */
typedef struct Seg {
    short      y;       /* row of interval (could be taken from scanline)
*
    short      xb;      /* leftmost x of the interval */
    short      xe;      /* rightmost x of the interval */
    short      da;      /* number of overlapping intervals above */
    short      db;      /* number of overlapping intervals below */
    struct Seg *ia;     /* Pointer to first overlapping interval above */
    struct Seg *ib;     /* Pointer to first overlapping interval below */
    short      seen;    /* Seg status */
    short      Btflg;
} Seg;
#define SNULL (Seg *)0
#define SLNULL (Sline *)0
/* Cooked scanline with intervals that are LAG nodes */
typedef struct Sline {
    short y;       /* row of scanline */
    short n;       /* number of segments */
    Seg *sp;       /* first segment */
    Seg *spend;    /* last segment */   struct Sline *next; /* next Sline */
} Sline;
/*
```

APPENDIX -continued

```
 * Connected Component of the LAG. It contains statistics of
/* the blob and a pointer to first segment. This implementation
/* requires re-traversal. To avoid that, the code in blob_find( )
/* should be modified to store a chain of segments.
*/
typedef struct Con_com {
    Seg *first_seg;  /* first segment of the segment chain */
    long Area;       /* number of black pixels */
    long seg_num;    /* number of segments */
    short Xmin, Ymin, Xmax, Ymax; /* boundingbox */
    short max_seg_len; /* maximum segment length */
    short Holes;     /* number of holes */
    short upward_end, downward_end; /* upward-, doward- ends */
        short upward_cup, downward_*cup; /* upward-,
        doward- arcs */
    char set; /* mark */
} con_com;
Seg     *next_seg( );
Seg     *look_up( ), *look_down( );
Seg     *search_up( ), *search_down( );
con_com **tmap;
#ifndef NULL
#define NULL 0
#endif
#define DELETED -2
int triangulate, sorted, plot, debug;
struct Freenode     {
        struct Freenode     *nextfree;
};
struct Freelist     {
        struct Freenode     *head;
        int                 nodesize;
};char *getfree( );
char *myalloc( );
float xmin, xmax, ymin, ymax, deltax, deltay;
struct Point {
float x,y;
/* structure used both for sites and for vertices */
struct Site {
        struct Point  coord;
        int           sitenbr;
        int           refcnt;
};
struct Site    *sites;
int            nsites;
int            siteidx;
int            sqrt_nsites;
int            nvertices;
struct Freelist sfl;
struct Site    *bottomsite;
struct Edge    {
float          a,b,c;
struct Site    *ep[2];
struct Site    *reg[2];
int            edgenbr;
#define le 0
#define re 1
int nedges;
struct Freelist efl;
int has_endpoint( ),right_of( );
struct Site *intersect( );
float dist( );struct Point PQ_min( );
struct Halfedge *PQextractmin( );
struct Edge *bisect( );
struct Halfedge {
struct Halfedge *ELleft, *ELright;
struct Edge    *ELedge;
int            ELrefcnt;
char           ELpm;
struct Site    *vertex;
float          ystar;
struct Halfedge *PQnext;
};
struct         Freelist      hfl;
struct         Halfedge *ELleftend, *ELrightend;
int            ELhashsize;
struct         Halfedge **ELhash;
```

-continued

APPENDIX

```
struct      Halfedge *HEcreate( ), *ELleft( ), *ELright( ),
            *ELleftbnd( );
struct      Site *leftreg( ), *rightreg( );
int PQhashsize;
struct Halfedge *PQhash;
struct Halfedge *PQfind( );
int PQcount;
int PQmin;
int PQempty( );
/* my addition, Delaunay triangulation table */
float *px, *py;
short **tri_tbl;
#define MAXEDGES    20
typedef struct graph {
    short n;                    /* number of links */
    short e[MAXEDGES];/* link list */
    char t[MAXEDGES];/* link orientation */
    short seen;
} graph;
void freeinit( );
void makefree( );
void ELinitialize( );
void ELinsert( );
void ELdelete( );
void PQinitialize( );
void PQdelete( );
void PQinsert( );
void deref( );
void ref( );
void out_bisector( );
void out_ep( );
void out_vertex( );
void out_site( );
void out_triple( );
void endpoint( );
void makevertex( );
```

What is claimed is:

1. A computer-implemented method of delineating titles within image data, comprising the steps of:

storing the image data in a buffer;

performing connected component extraction upon the stored image data to identify a plurality of connected components and to generate a first data structure for storing a data objects corresponding to said connected components;

for each data object stored in said first data structure, identifying at least a first attribute reflecting the shape of the corresponding connected component and a second attribute reflecting a geometric property of the corresponding connected component and storing said first and second attributes in association with said first data structure;

analyzing at least said first attributes to identify which data objects correspond to image data representing text;

performing a nearest-neighbor analysis using geometric distance among said data objects to construct at least one nearest-neighbor graph of linked data objects that corresponds to image data representing at least a portion of at least one line of text;

analyzing said second attributes to determine an average geometric property of the connected components that correspond to image data representing text;

for each nearest-neighbor graph corresponding to image data that represents at least one line of text, comparing the stored second attributes of the data objects associated with each graph with said average geometric property;

selecting as title candidates those nearest-neighbor graphs in which the component data objects have second attributes substantially different from than said average geometric property;

defining a bounding box for each of said title candidates and merging said bounding boxes of title candidates corresponding to at least one line of text to define at least one merged bounding box; and associating said merged bounding box with said stored image data, whereby said merged bounding box delineates portions of said stored image data that represent titles.

2. The method of claim 1 wherein said geometric property is size.

3. The method of claim 1 further comprising analyzing said nearest-neighbor graphs corresponding to image data that represents at least one line of text to determine the spatial orientation.

4. The method of claim 1 further comprising designating said nearest-neighbor graphs corresponding to image data that represents at least one line of text as being either generally horizontally oriented text or generally vertically oriented text.

5. The method of claim 4 wherein said designating is performed by comparing said nearest-neighbor graphs corresponding to image data that represents at least one line of text to predefined data representing a forty-five (45) degree incline.

6. The method of claim 4 further comprising separately determining:

(a) the horizontal average font size of connected components corresponding to image data representing generally horizontally oriented text and (b) the vertical average font size of connected components corresponding to image data representing generally vertically oriented text; and using said separately determined average font sizes to select as title candidates:

(a) those nearest neighbor graphs corresponding to image data representing generally horizontally oriented lines of text in which the component data objects have size attributes greater than said horizontal average font size; and (b) those nearest-neighbor graphs corresponding to image data representing generally vertically oriented lines of text in which the component data objects have size attributes greater than said vertical average font size.

7. The method of claim 1 wherein said image data is single bit data representing monochrome values.

8. The method of claim 1 wherein said image data is multi-bit data representing gray-scale values.

9. The method of claim 1 wherein said image data is multi-bit data representing color values.

10. The method of claim 1 wherein said first geometric attribute is selected from the group consisting of: number of black pixels, number of white pixels, number of holes, number of stroke ends, number of stroke upturned arcs, number of stroke downturned arcs.

11. The method of claim 1 wherein said second attribute defines a bounding box around the connected component.

12. The method of claim 1 wherein said second attribute defines a rectangular bounding box around the connected component characterized by upper, lower, left and right bounding lines.

13. The method of claim 1 further comprising analyzing said first and second attributes to identify which data objects correspond to image data representing text.

14. The method of claim 1 wherein said first attribute corresponds to the number of image pixels of a predefined color and wherein said step of analyzing said first attributes to identify which data objects correspond to image data representing text is performed by comparing the first attribute to a predetermined threshold.

15. The method of claim 1 wherein said first attribute corresponds to the number of black image pixels and wherein said step of analyzing said first attributes to identify which data objects correspond to image data representing text is performed by declaring that the image data does not represent text if the first attribute is below a predetermined threshold value.

16. The method of claim 1 wherein said first attribute corresponds to a bounding box enclosing the connected component having a height and width, and wherein said step of analyzing said first attributes to identify which data objects correspond to image data representing text is performed by comparing at least one of said height and width to a predetermined threshold.

17. The method of claim 1 wherein said first attribute corresponds to a bounding box enclosing the connected component having a height and width and wherein said step of analyzing said first attributes to identify which data objects correspond to image data representing text is performed by declaring that the image data does not represent text if at least one of said height and width is above a predetermined threshold value.

18. The method of claim 1 wherein said first attribute corresponds to an average stroke width and wherein said step of analyzing said first attributes to identify which data objects correspond to image data representing text is performed by declaring that the image data does not represent text if said first attribute is above a predetermined threshold.

19. The method of claim 18 wherein said connected component extraction is performed by segmenting said stored image data into segments containing black pixels and wherein said average stroke width is calculated as the ratio of the number of black pixels to the number of black segments.

20. The method of claim 1 wherein said first attribute corresponds to a bounding box enclosing the connected component having a height and width and wherein said step of analyzing said first attributes to identify which data objects correspond to image data representing text is performed by declaring that the image data does not represent text if the ratio of width to height is above a predetermined threshold.

21. The method of claim 1 wherein said first attribute corresponds to a bounding box enclosing the connected component having a height and width and wherein said step of analyzing said first attributes to identify which data objects correspond to image data representing text is performed by declaring that the image data does not represent text if at the ratio of height to width is above a predetermined threshold.

22. The method of claim 1 wherein said first attribute corresponds to the number of white pixels in the connected component and wherein said step of analyzing said first attributes to identify which data objects correspond to image data representing text is performed by declaring that the image data does not represent text if the first attribute is above a predetermined threshold value.

23. The method of claim 1 wherein said first attribute corresponds to the number of line ends in the connected component and wherein said step of analyzing said first attributes to identify which data objects correspond to image data representing text is performed by declaring that the image data does not represent text if the first attribute is above a predetermined threshold value.

24. The method of claim 1 wherein said first attribute corresponds to a bounding box enclosing the connected component having a size determined by the box's height and width and further corresponds to the number of black image pixels within the connected component, and wherein said step of analyzing said first attributes to identify which data objects correspond to image data representing text is performed by declaring that the image data does not represent text if the ratio of the number of black image pixels to the size of said bounding box is below a predetermined threshold.

25. The method of claim 1 further comprising extracting a title from said image data by copying a subset of said stored image data delineated by said bounding box to a storage buffer.

26. The method of claim 1 further comprising extracting a title from said image data by performing optical character recognition on a subset of said stored image data delineated by said bounding box to generate text data corresponding to the delineated title.

27. The method of claim 1 further comprising using said bounding box to generate text data corresponding to the delineated title and using said text data as an index associated with said image data.

28. The method of claim 1 further comprising using said bounding box to generate text data corresponding to the delineated title and using said text data as a computer-searchable keyword associated with said image data.

29. The method of claim 1 further comprising for each data object stored in said first data structure, identifying a plurality of second attributes, each reflecting a different geometric property of the corresponding connected component.

30. The method of claim 29 further comprising analyzing said second attributes in a predetermined sequential order to select as title candidates those nearest-neighbor graphs in which the component data objects have attributes that meet predefined characteristics.

31. The method of claim 29 further comprising analyzing said second attributes substantially concurrently to select as title candidates those nearest-neighbor graphs in which the component data objects have attributes that meet predefined characteristics.

32. A method of delineating photographic regions within image data, comprising the steps of:

storing the image data in a buffer;

performing connected component extraction upon the stored image data to identify a plurality of connected components and to generate a first data structure for storing data objects corresponding to said connected components;

for each data object stored in said first data structure, identifying at least a first attribute reflecting the height-to-width ratio of the corresponding connected component and storing said first attribute in association with said first data structure;

analyzing at least said first attributes to identify which data objects correspond to image data representing possible photographic regions by defining a bounding box for each of said connected components and selecting as photographic region candidates those connected components having bounding boxes greater than a predetermined threshold size;

further analyzing said first attributes of said photographic region candidates to select as photographic regions those candidates having first attributes that bear a first relationship with a predetermined threshold;

merging said bounding boxes of said selected photographic regions whose respective bounding boxes overlap to define at least one merged bounding box; and associating said merged bounding box with said stored image data, whereby said merged bounding box delineates portions of said stored image data that represent said photographic regions.

33. The method of claim 32 wherein said first attribute umber of black pixels in said connected component.

34. The method of claim 32 wherein said first attribute represents the ratio of the number of black pixels to the size of the bounding box of said connected component.

35. The method of claim 32 wherein said first attribute represents the number of white pixels in said connected component.

36. The method of claim 32 wherein said first attribute represents the number of upward and downward ends in said connected component.

* * * * *